(12) United States Patent
Kadyk et al.

(10) Patent No.: US 7,269,659 B2
(45) Date of Patent: *Sep. 11, 2007

(54) AUTHENTICATION THROUGH MULTIPLE PROXY SERVERS

(75) Inventors: Donald J. Kadyk, Bothell, WA (US); Neil S. Fishman, Bothell, WA (US); Kevin T. Damour, Bellevue, WA (US); Michael Kramer, Yonkers, NY (US)

(73) Assignee: Microsoft Corporation, Redmond, WA (US)

( * ) Notice: Subject to any disclaimer, the term of this patent is extended or adjusted under 35 U.S.C. 154(b) by 518 days.

This patent is subject to a terminal disclaimer.

(21) Appl. No.: 10/977,208

(22) Filed: Oct. 29, 2004

(65) Prior Publication Data

US 2005/0114531 A1    May 26, 2005

Related U.S. Application Data

(63) Continuation of application No. 09/838,408, filed on Apr. 19, 2001, now Pat. No. 6,839,761.

(51) Int. Cl.
*G06F 13/00* (2006.01)

(52) U.S. Cl. .................. 709/229; 709/203; 709/237; 709/227; 726/12

(58) Field of Classification Search ................ 709/229, 709/203, 237, 227; 726/12
See application file for complete search history.

(56) References Cited

U.S. PATENT DOCUMENTS

| | | | |
|---|---|---|---|
| 5,805,803 A * | 9/1998 | Birrell et al. ............... 726/12 |
| 6,112,228 A * | 8/2000 | Earl et al. ................... 709/205 |
| 6,324,648 B1 * | 11/2001 | Grantges, Jr. ................ 726/12 |
| 6,442,610 B1 * | 8/2002 | Khanna et al. .............. 709/227 |
| 6,510,464 B1 * | 1/2003 | Grantges et al. ............ 709/225 |
| 6,684,331 B1 * | 1/2004 | Srivastava .................. 713/163 |
| 6,785,705 B1 * | 8/2004 | Kocherlakota .............. 709/203 |
| 6,839,761 B2 * | 1/2005 | Kadyk et al. ............... 709/229 |
| 2003/0005280 A1 * | 1/2003 | Bobde et al. ............... 713/150 |
| 2003/0009523 A1 * | 1/2003 | Lindskog et al. ........... 709/205 |

FOREIGN PATENT DOCUMENTS

| EP | 1251672 A1 * | 10/2002 |
|---|---|---|
| WO | WO9936865 A1 * | 7/1999 |

* cited by examiner

*Primary Examiner*—Kenneth R. Coulter
(74) *Attorney, Agent, or Firm*—Workman Nydegger

(57) ABSTRACT

Methods, systems, computer program products and data structures are described which allow a client to communicate with a server even though multiple proxies that require different authentication data must be traversed to allow such communication. In operation, the client first authenticates to a first proxy using authentication data appropriate for the first proxy. The client then authenticates to a second proxy using different authentication data that is appropriate for the second proxy. This proxy authentication continues through as many proxies as necessary until the client is in communication with the server.

20 Claims, 11 Drawing Sheets

AUTHENTICATION THROUGH MULTIPLE PROXY SERVERS

CROSS-REFERENCE TO RELATED APPLICATIONS

This application is a continuation of prior application Ser. No. 09/838,408 filed Apr. 19, 2001 and entitled "METHODS AND SYSTEMS FOR AUTHENTICATION THROUGH MULTIPLE PROXY SERVERS THAT REQUIRE DIFFERENT AUTHENTICATION DATA" which issued on Jan. 4, 2005 as U.S. Pat. No. 6,839,761, the disclosure of which is incorporated into this application by reference.

BACKGROUND OF THE INVENTION

1. The Field of the Invention

The present invention relates to the field of electronic authentication. In particular, the present invention relates to methods and systems for authentication through multiple proxy servers that require different authentication data such as user identification and password.

2. Background and Related Art

A "proxy server" or "proxy" is a computer or computer system that acts as an intermediary between a client computer system (hereinafter, a "client") and a server computer system (hereinafter, a "server"). When a client submits a request to a server, the proxy, through which the request must traverse, may require client authentication that is independent of the client authentication required by the server. One typical way for a client (or a user thereof) to authenticate to the proxy is to provide authentication data such as a user identification (ID) and password to the proxy. The client may also provide a separate user ID and password to the server when authenticating to the server.

The Internet standard HyperText Transport Protocol (HTTP) provides a transport level protocol for communicating between a client and server. Among other things, HTTP provides for a means for authentication to a proxy even though that proxy requires different authentication data than the server. Conventional HTTP allows for a header field that may include a user ID and password for authenticating to the proxy. HTTP also allows for a separate header that may include a separate user ID and password for authenticating to the server. Even if HTTP requests from the client traverse multiple proxies that require authentication on the way to the server, so long as the proxies each require the same user ID and password (as is often the case when the multiple proxies are managed by the same entity), the header that includes the password for the proxy may be used to authenticate to each proxy. Thus, conventional methods allow HTTP to be used to authenticate to a single proxy (or to multiple proxies that require the same user ID and password) and to a server.

These conventional methods have some advantages, including allowing for authentication to multiple proxies within a single administrative domain, all of which use the same credentials. However, these conventional methods do not allow for authentication through multiple proxies if those proxies require different authentication data as compared to each other.

Often, proxies that reside within a common sphere of trust may use the same user ID and password when authenticating a particular user. For example, proxies that are managed by the same entity may often use the same user ID and password to authenticate a particular user. However, it may be desirable to allow proxies between the client and server to user different authentication data when authenticating the user of the client. For example, suppose that the client is a wireless device and the server is a corporate server. The wireless device may communicate through a proxy managed by the wireless service as well as a proxy managed by the corporation that hosts the corporate server. The wireless service and the corporate server may not trust each other so far as to share a common user ID and password for a given user.

Therefore, what is desired are systems and methods for authentication through multiple proxies even though those multiple proxies may require different user IDs and passwords when authenticating. It would further be desirable if such authentication could be done so that each proxy may only access the authentication data relevant for authentication to that particular proxy, and not be able to access different authentication data intended for other proxies. It would also be desirable if such authentication could be done without modification of existing protocols and standards.

SUMMARY OF THE INVENTION

Methods, systems, computer program products and data structures are described which overcome the foregoing problems with the state of the art. Specifically, the principles of the present invention enable a client to communicate with a server even though the client must first authenticate to multiple proxies that require different authentication data. The principles of the present invention permit for such communication without having to expose authentication data that applies to a particular proxy to any proxies that are closer to the original server. Therefore, a relatively high degree of confidentiality is maintained between the multiple proxies. In addition, the present invention may be implemented without having to change existing standards, although the way that those standards are used is unique and inventive.

In accordance with a first embodiment of the present invention, the client dispatches a request for a service through a first proxy. This first request for service may be a standard HTTP request. The first proxy then returns an authentication request such as, for example, a 407 Proxy Authentication Response in accordance with HTTP.

The client then authenticates the user to the first proxy (or first group of proxies that all require the same authentication data) by first receiving the authentication request from the first proxy. The client then retrieves authentication data appropriate to authenticate to the first proxy. The client then includes that authentication data in another request for the service and then dispatches that second request.

The first proxy (or first group of proxies that all require the same authentication data) that must be negotiated receives the request for service, reads the appropriate authentication data, and then forwards the request for service to the second proxy that must be negotiated. This second proxy (or group of proxies that require the same authentication data as each other) requires different authentication data from the first proxy. Therefore, the second proxy is not satisfied with the authentication data in the request and, depending on the authentication protocol used, may not even be able to read the authentication data in the request. The second proxy thus returns an authentication request to the client via the first proxy.

The client then authenticates the user to the second proxy by first receiving the authentication request from the second proxy. The client then retrieves authentication data appropriate to authenticate to the second proxy. The client then includes that authentication data for the first and second proxies in yet another request for service and dispatches that request for service.

The first proxy receives the request for service, reads the appropriate authentication data, and then forwards the request for service to the second proxy that must be negotiated. The first proxy also optionally removes the first authentication data from the request for service so that the first authentication data is not exposed to the second proxy.

The second proxy then receives the request for service, reads the appropriate authentication data, and then forwards the request for service to the server if there are no other proxies that must be negotiated. If there are further proxies that require yet other authentication data, the process of authentication would repeat until all proxies have been negotiated.

The second embodiment is similar to the first embodiment in many respects except for the following differences. In the second embodiment, instead of dispatching requests for service through multiple proxies, the client makes a connect request directly to the next proxy that has not yet been authenticated to. Thus, the client first makes a connect request to the first proxy which responds with an authentication request. The client then makes a connect request to the second proxy, the connect request including the authentication data for the first proxy. The first proxy receives the connect requests, authenticates, and then enters byte forwarding mode making the first proxy transparent to the client. The connect request is forwarded to the second proxy which responds with an authentication request. The client then dispatches a connect request to the server if there are no other proxies that must be negotiated. The connect request would include the authentication data for both the first and second proxies. If there are further proxies to negotiate, connect requests would be made to successive proxies as described herein until all proxies are negotiate and a connect request may be made directly to the server with the connect request including all authentication data for all intervening proxies.

The first and second embodiments rely on the ability to include different authentication data for different proxies within a single request. In order to accomplish this, a unique request data structure is described. In particular, an HTTP request is described as having an associated authentication header such as the "WWW-Authenticate Response Header" permitted by the HTTP authentication method. The different authentication data is included under the authentication header with each authentication data set for each proxy identified by a realm as permitted by the authentication method. In this application, a given act is "permitted" or "permissible" by a given protocol or method if the given act may be performed using the protocol or method without violating express standards for the protocol or method. It does not mean that the protocol or method describes the given act nor that the act would be obvious given knowledge of the protocol or method. If the digest authentication method is employed, authentication data is not transmitted in the clear, but is encrypted. Thus, only the appropriate proxy can read the authentication data relevant to that proxy, thus preserving confidentiality between proxies.

Therefore, the principles of the present invention allow for a client to communicate with a server even if multiple proxies that require different authentication data must be traversed in order to establish such communication. In addition, such authentication may be accomplished without exposing authentication data to proxies that are closer towards the original server as compared to the proxy for which the authentication data pertains. In addition, the authentication may be accomplished without having to change existing standards.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends to methods, systems, computer program products and data structures for a client to communicate with a server even though multiple proxies that require different authentication data must be traversed to allow such communication. Proxies that require different authentication data as compared to each other will be referred to herein as "heterogenic authentication" proxies. In operation, the client first authenticates to a first proxy using authentication data appropriate for the first proxy. The client then authenticates to a second proxy using different authentication data that is appropriate for the second proxy. This proxy authentication continues through as many proxies as necessary until the client is in communication with the server.

The principles of the present invention enables a client to communicate through these multiple heterogenic authentication proxies using existing transport protocols such as the HyperText Transport Protocol (HTTP), existing security protocols such as the Secure Socket Layer (SSL) protocol, and existing authentication protocols such as the HTTP authentication methods. The principles of the present invention may also be applied to future developed protocols as well.

The embodiments of the present invention may comprise a special purpose or general purpose computer including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
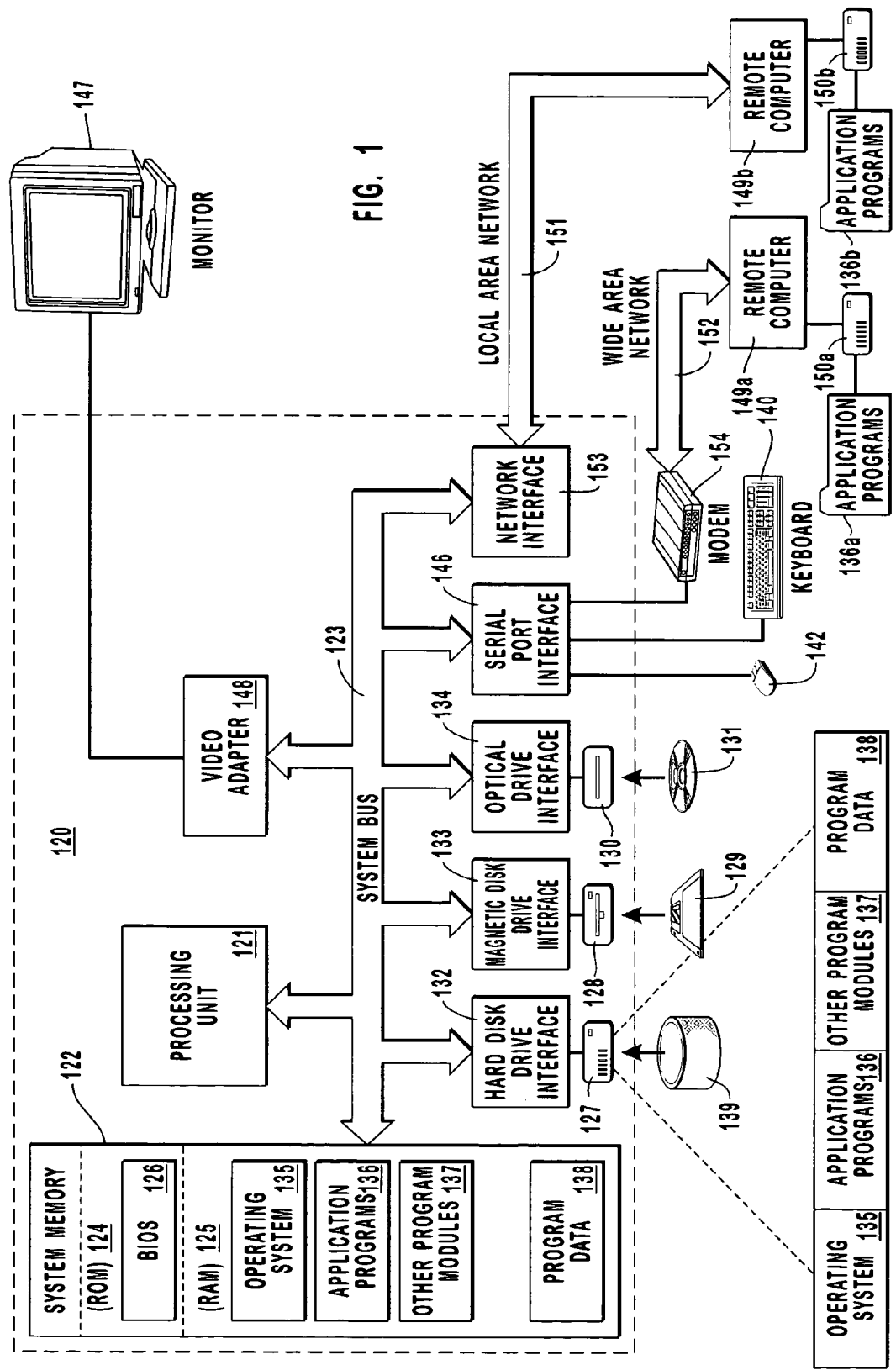
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Figure 2:
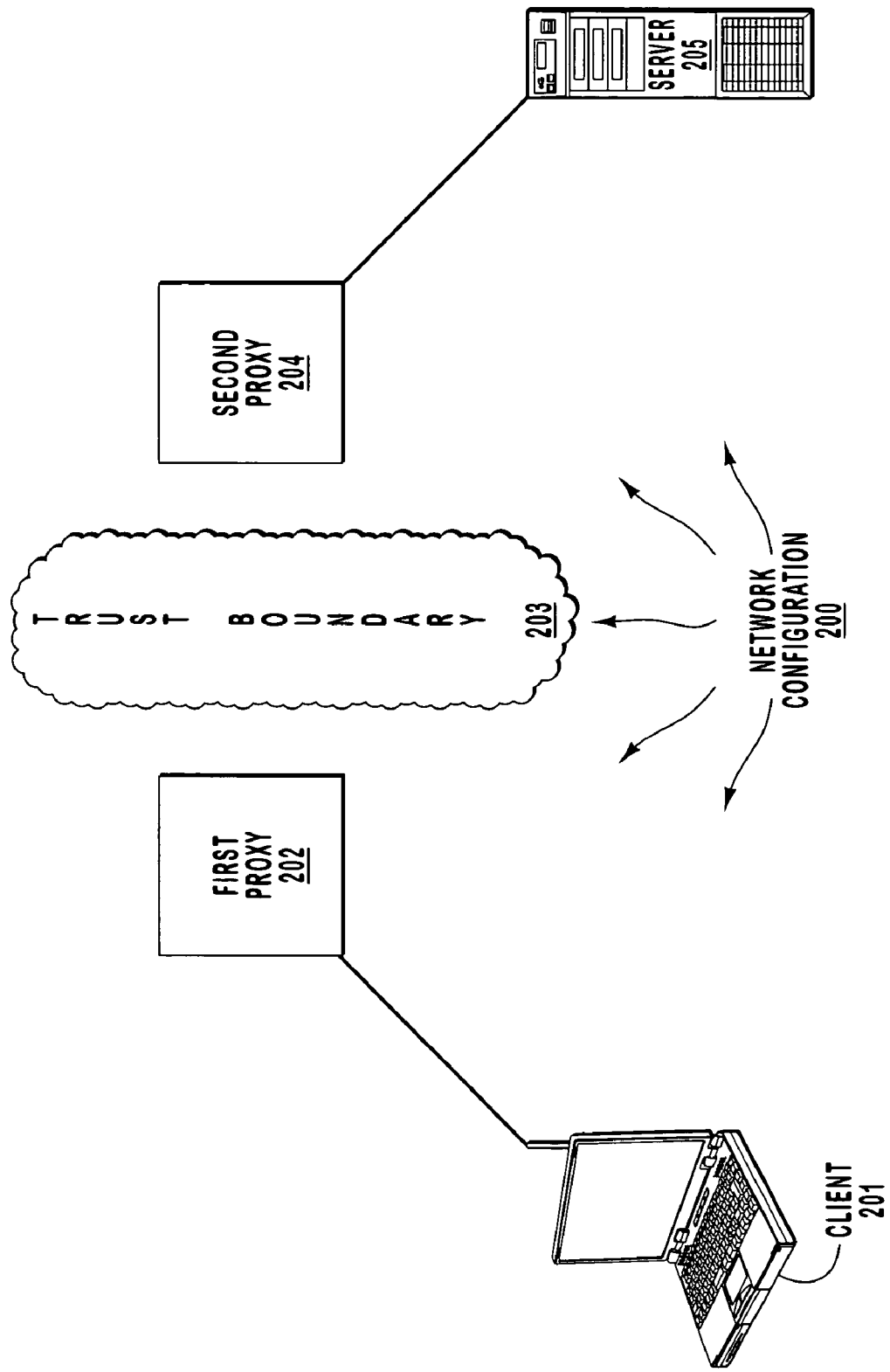
FIG. 2 illustrates a network configuration in which a client must negotiate through two proxies that require different authentication data in order to communicate with a server.

The present invention may be used in an environment in which a client must authenticate to multiple proxies that require different authentication data from the client. FIG. 2 illustrates a network configuration 200 in which the client must authenticate to two proxies that reside on different sides of a trust boundary so that each proxy is not willing to share authentication data.

In the network configuration, in order to communicate between client computer system (also called "client") 201 and server computer system (also called "server") 205, the client must authenticate itself to both the first proxy 202 and the second proxy 204 even though they both require different authentication data. Since the first proxy 202 and the second proxy 204 require different authentication data, they properly fall within the definition of "heterogenic authentication" proxies defined above.

The first proxy 202 and the second proxy 204 are shown divided by a trust boundary 203 to indicate that the administrating entity of the first proxy 202 may choose to have different authentication data than the administrating entity of the second proxy 204 for security reasons. However, it is not required that the first and second proxies are administered by different entities or that they reside in different spheres of trust.

When communicating through multiple proxies that require the same authentication data (hereinafter also called "homogeneous authentication" proxies), conventional processes allow each of the homogenous authentication proxies to read the authentication data from a request and forward that request on. The first proxy 202 may represent either a single proxy, or multiple proxies that require the same authentication data. Either way, providing the correct authentication data to the first proxy 202 will allow communications through the first proxy 202. Similarly, the second proxy 204 may represent either a single proxy, or multiple proxies that require the same authentication data (though different from the authentication data required by the first proxy 202). Either way, providing the correct authentication data to the second proxy will allow communications through the second proxy 204.

The client 201 is illustrated as being a wireless device in order to describe one potential situation in which multiple proxies that require different authentication data may need to be traversed in order to access a server computer system such as server 205. However, the client 201 may be any computer system (such as the computer 120 described above) that needs to authenticate to multiple proxies that require different authentication data in order to communicate with a server. If the client 201 is a wireless device, the client 201 may first have to authenticate to a proxy (such as proxy 202) that is administered by a wireless carrier. However, the client 201 may desire to communicate with a server that is protected by a different proxy (such as proxy 204) that is managed by a corporate entity. That proxy 204 may also require authentication before allowing access to the server 205. However, the corporate entity and the wireless carrier may not trust each other enough to allow the same authentication data to represent the same user. Thus, in this circumstance, the first proxy 202 and the second proxy 204 would require different authentication data. The server 205 may be structured as described above for computer 120 although this is also not required.

Figure 3:
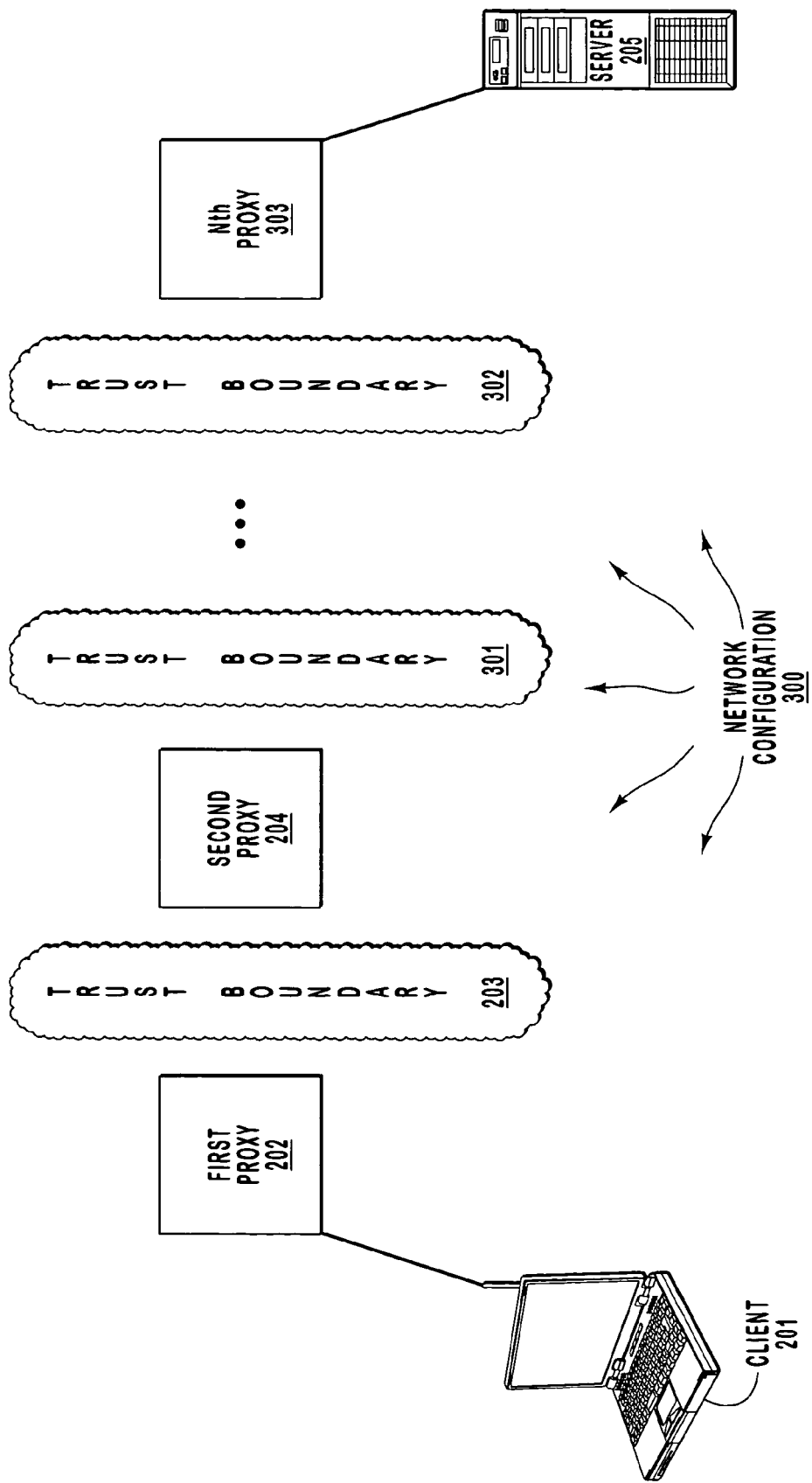
FIG. 3 illustrates a network configuration in which a client must negotiate though more than two proxies that require different authentication data in order to communicate with a server.

FIG. 3 illustrates a network configuration 300 in which the client 201 needs to traverse more than two proxies that require different authentication data in order to communicate with the server 205. FIG. 3 is provided to illustrate that the principles of the present invention are not limited to network configurations that have two proxies that require different authentication data. The network configuration includes an arbitrary number ("N") of heterogenic authentication proxies wherein N is two in FIG. 2 and more than two in FIG. 3. For example, the network configuration includes an N'th proxy 303 and further trust boundaries 301 and 302.

FIGS. 4 through 7 schematically illustrate a data flow in accordance with the present invention as it would occur in the network configuration of FIG. 2. FIGS. 4 through 7 are similar to FIG. 2 except that a memory associated with the client 201 is shown for clarity. Also, the trust boundary is removed to emphasize that it is not necessary that the first proxy 202 and second proxy 204 reside in different spheres of trust. Also, arrows are provided illustrating data flow. Where multiple arrows are shown in a single figure, the arrowhead contains a number indicating the order of operation within the figure.

Although the focus of the description will be on the environment shown in FIG. 2, there will also be some description on how the principles of the present invention may apply to the network configuration shown in FIG. 3 in which there are more than two heterogenic authentication proxies. A corresponding flowchart of a method for authenticating to multiple heterogenic authentication proxies is shown in FIG. 8. FIG. 4 through 7 will be described with frequent reference to FIG. 8.

Figure 4:
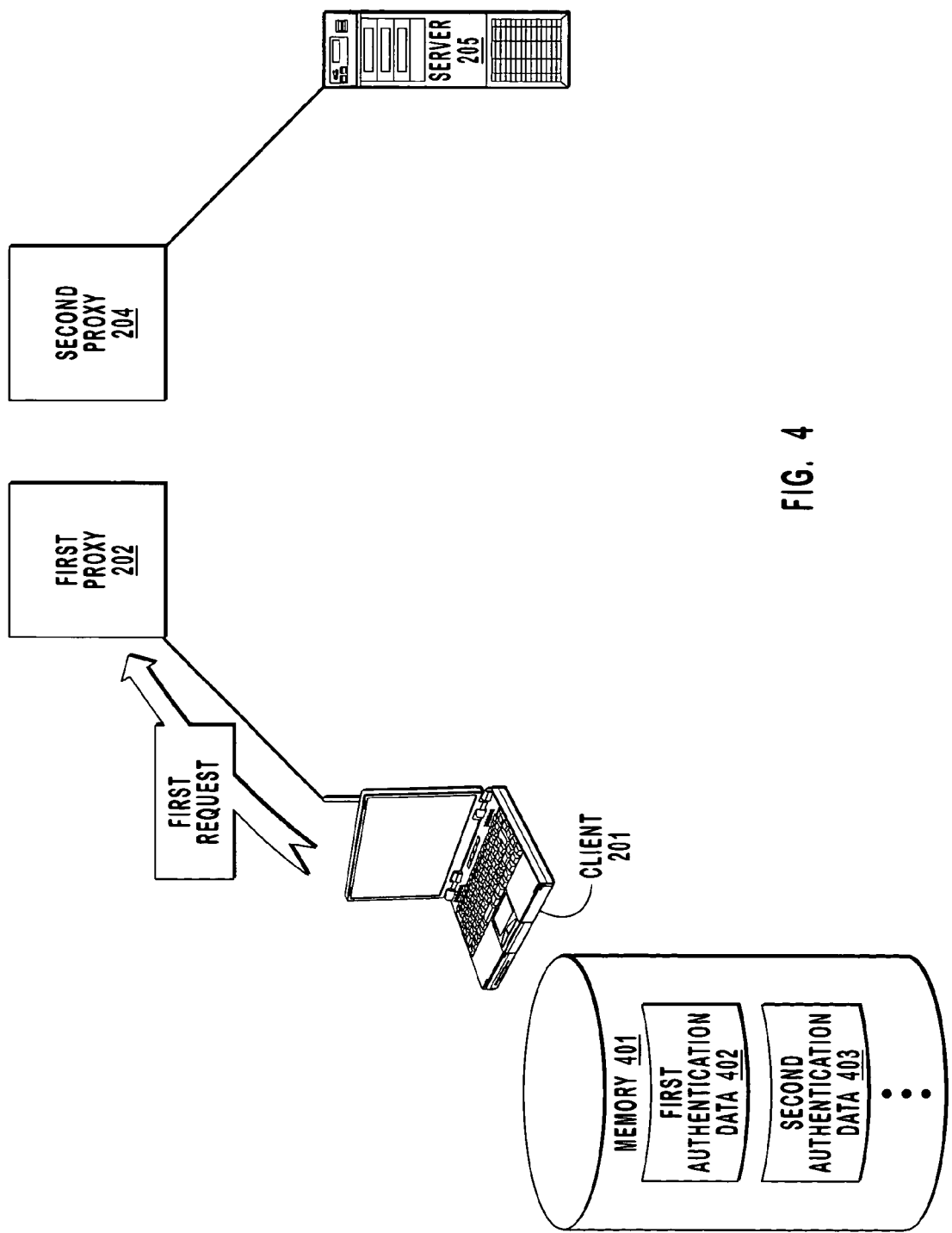
FIG. 4 illustrates a data flow in the network configuration of FIG. 2 in which the client dispatches a first request for a service in accordance with a first embodiment of the present invention.
Figure 5:
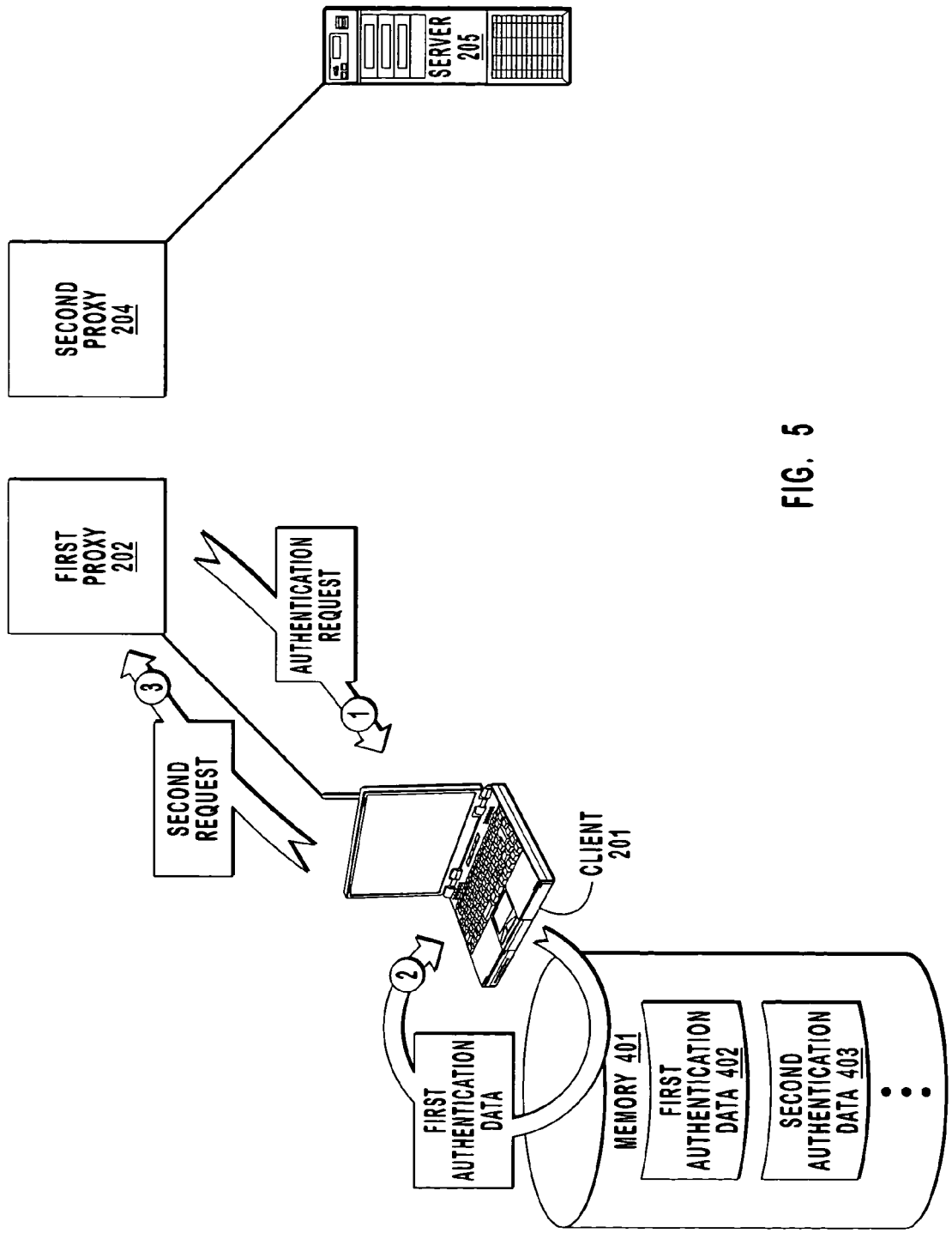
FIG. 5 illustrates three ordered data flows involved with the client authenticating to the first proxy in accordance with the first embodiment of the present invention.
Figure 6:
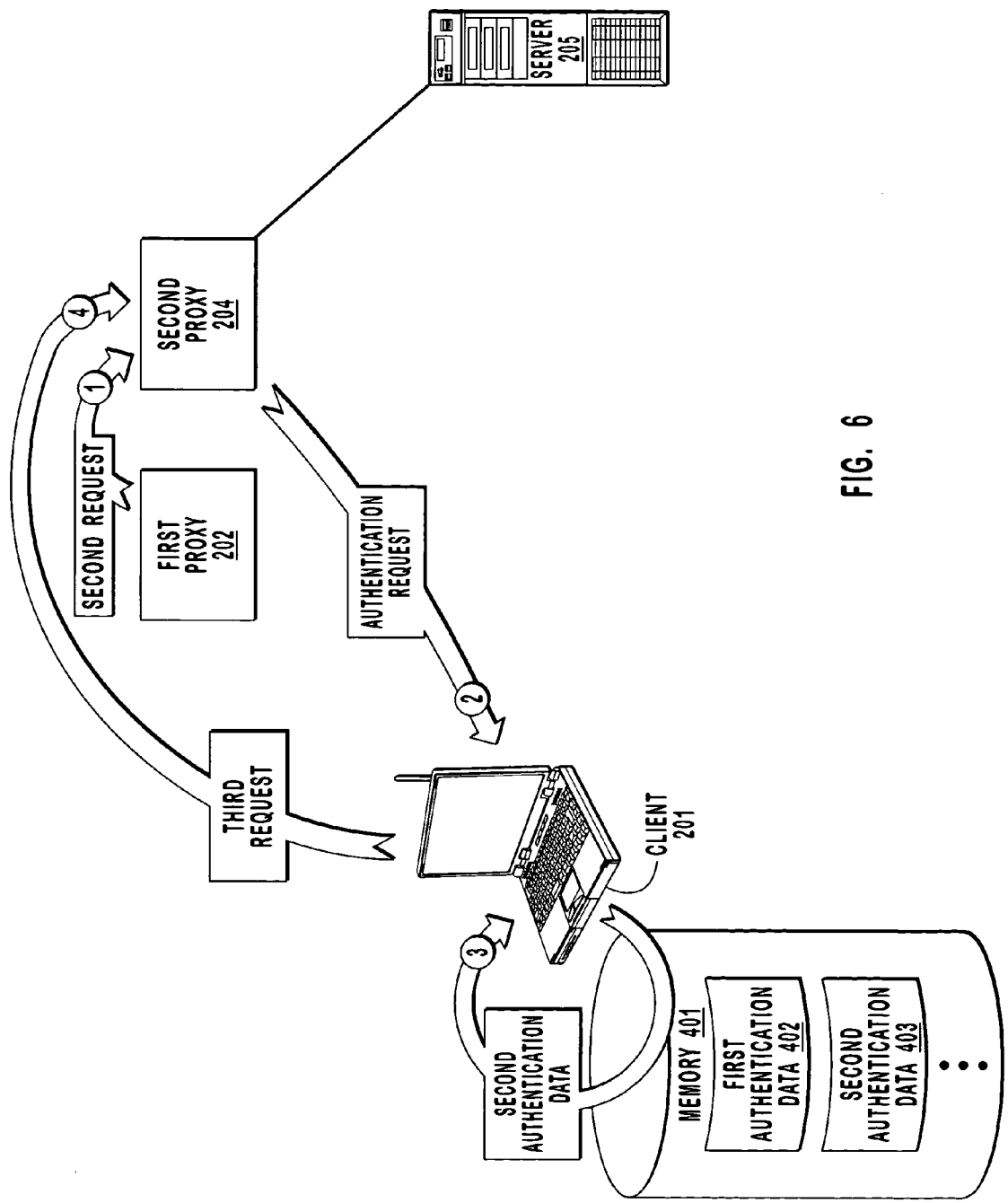
FIG. 6 illustrates four ordered data flows involved with the client authenticating to the second proxy in accordance with the first embodiment of the present invention.

Referring to FIGS. 4 and 8, the client 201 dispatches a first request for a service (act 801). This first request may be a request in accordance with the Internet standard HTTP. The client 201 then performs a step for authenticating to the first proxy (step 802) which, in the embodiment illustrated in FIGS. 4 through 8, includes corresponding act 803, act 804 and act 805. Specifically, with reference to FIG. 5 and FIG. 8, the first proxy 202 dispatches a first authentication request, which the client 201 ultimately receives (act 803). The first authentication request may be, for example, a 407 Proxy Authentication Response in accordance with HTTP. In response to this authentication request, the client 201 retrieves first authentication data 402 from memory 401, the first authentication data 402 associated with the first proxy (act 804). The client 201 then dispatches a second request for the service 205, the second request including the first authentication data 402 (act 805). The client 201 may retrieve the first authentication data 402 and dispatch the second request automatically, and without requiring user intervention, upon receiving the authentication request from the first proxy 202.

The client 201 then performs a step for authenticating to the second proxy (step 806) which, in the embodiment illustrated in FIGS. 4 through 8, includes corresponding act 807, act 808 and act 809. Specifically, with reference to FIG. 6 and FIG. 8, the second proxy 204 dispatches a second authentication request, which the client 201 ultimately receives via the first proxy 202 (act 807). The first proxy 202 received the second request for service, used the first authentication data 402 to authenticate the user of the client 201, and then forwarded the second request to the second proxy 204. Since the second proxy 204 does not recognize the first authentication data 402 and since no other authentication data was provided in the second request, the second proxy 204 dispatched the second authentication request. The second authentication request may also be a 407 Proxy Authentication Response.

In response to this second authentication request, the client 201 retrieves second authentication data 403 from memory 401, the second authentication data 403 associated with the second proxy 204 (act 808). The client 201 then dispatches a third request for the service, the third request including the first authentication data 402 and the second authentication data 403 (act 809). The client 201 may retrieve the second authentication data 403 and dispatch the third request automatically, and without requiring user intervention, upon receiving the authentication request from the second proxy 204. The first proxy 202 then uses the first authentication data 402 within the third request to authenticate the user of the client 201, and then forwards the third request to the second proxy 204. Optionally, the first proxy 202 may remove the first authentication data so that the authentication data is not exposed to the second proxy 204. The second proxy 204 then uses the second authentication data 403 within the third request to authenticate the user.

Figure 7:
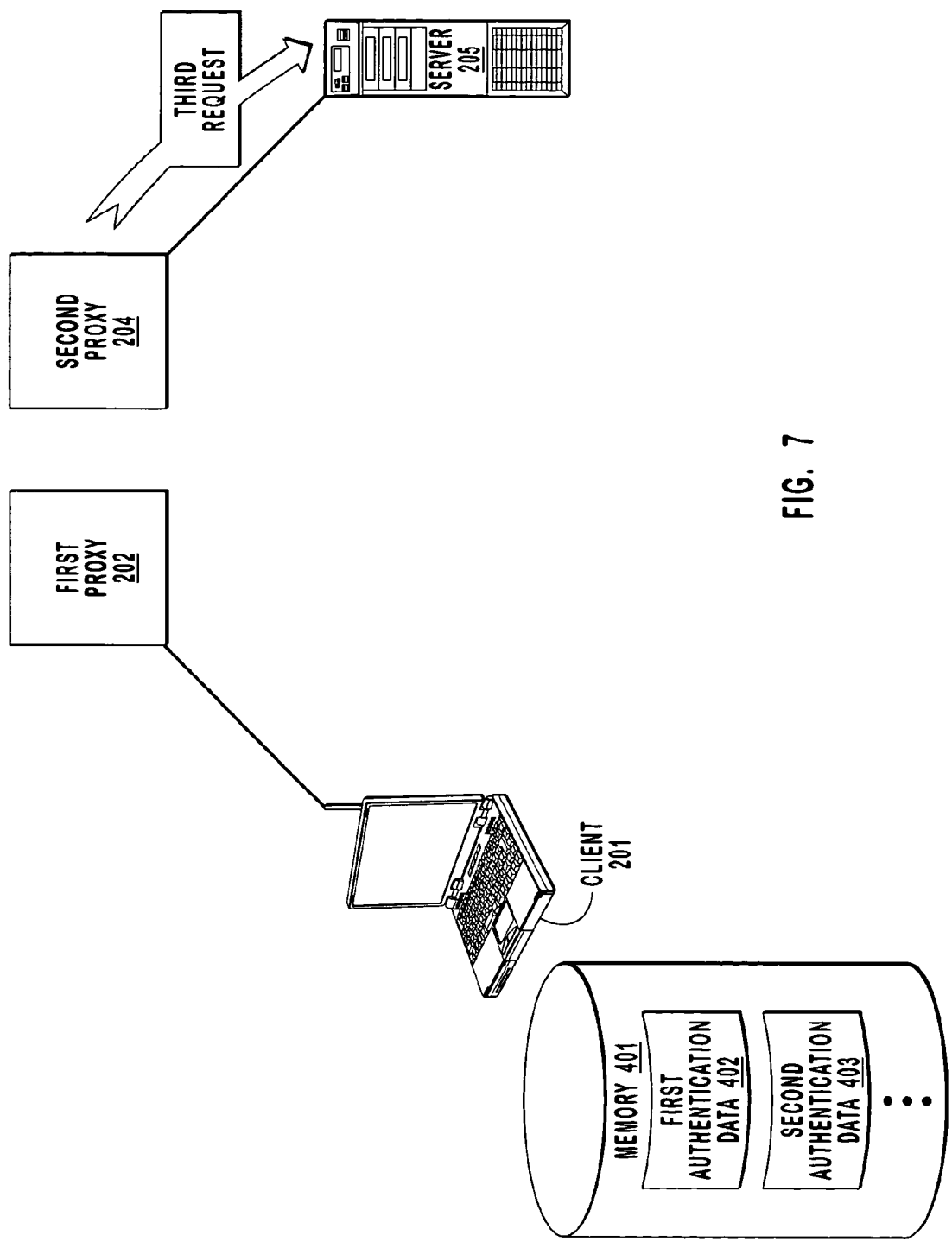
FIG. 7 illustrates a data flow that completes the communication through the first and second proxies so that communication is established between the client and the server in accordance with the first embodiment of the present invention.
Figure 8:
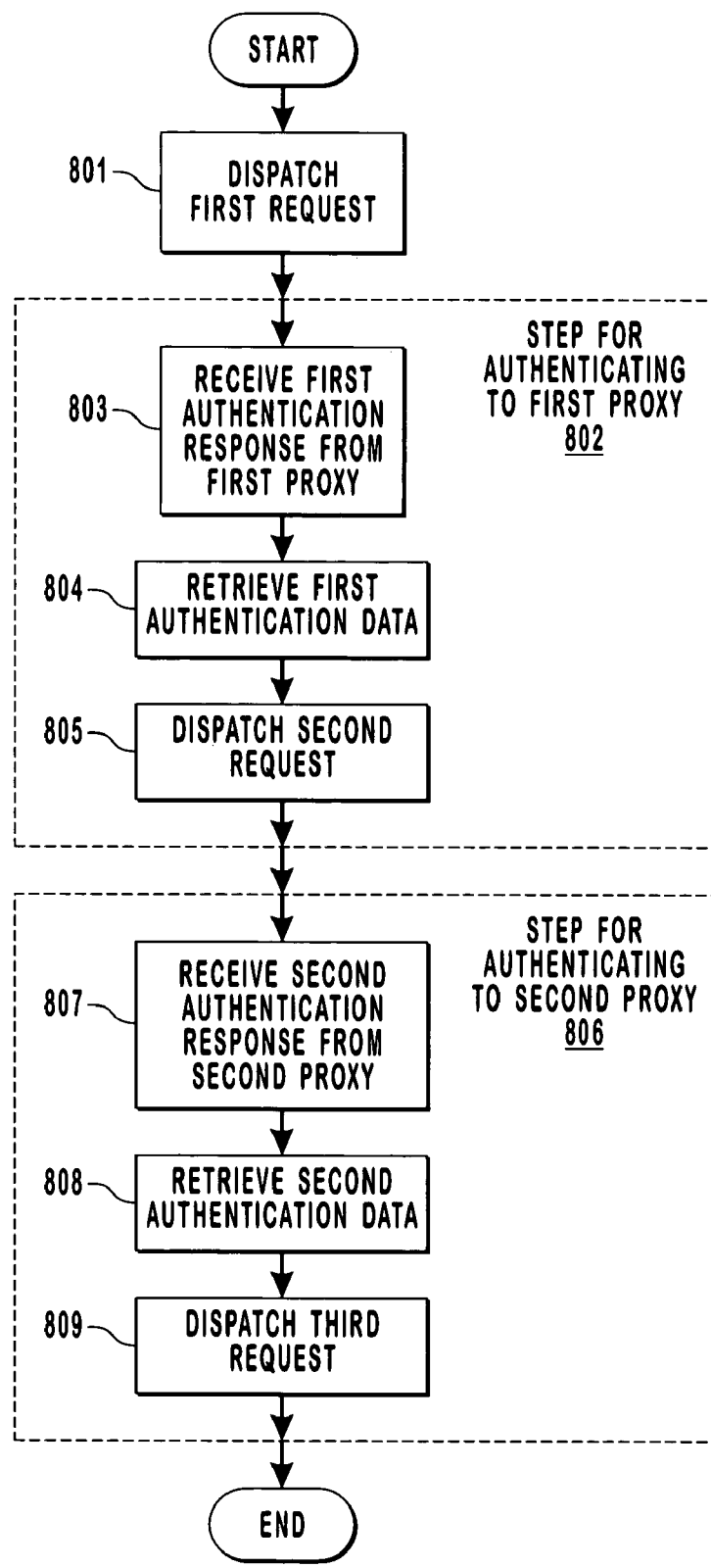
FIG. 8 illustrates a flowchart of a method for the client to communicate with the server despite having to negotiate through multiple proxies that require different authentication data in accordance with the first embodiment of the present invention.

As illustrated in FIG. 7, the second proxy 204 then forwards the third request to the server 205 to thereby establish communication between the client 201 and server 205 even though multiple heterogenic authentication proxies needed to be traversed. If there were more than two heterogenic authentication proxies involved as with FIG. 3, then the third request would be forwarded to the third proxy. The processes described above would be repeated until the request for the service included all authentication data required for all of the relevant heterogenic authentication proxies. The formulation of the third request to include both the first and second authentication data (and other authentication data if there are more than two heterogenic authentication proxies) may be accomplished by using existing protocols to create a unique data structure as described below with reference to FIG. 11.

Figure 9:
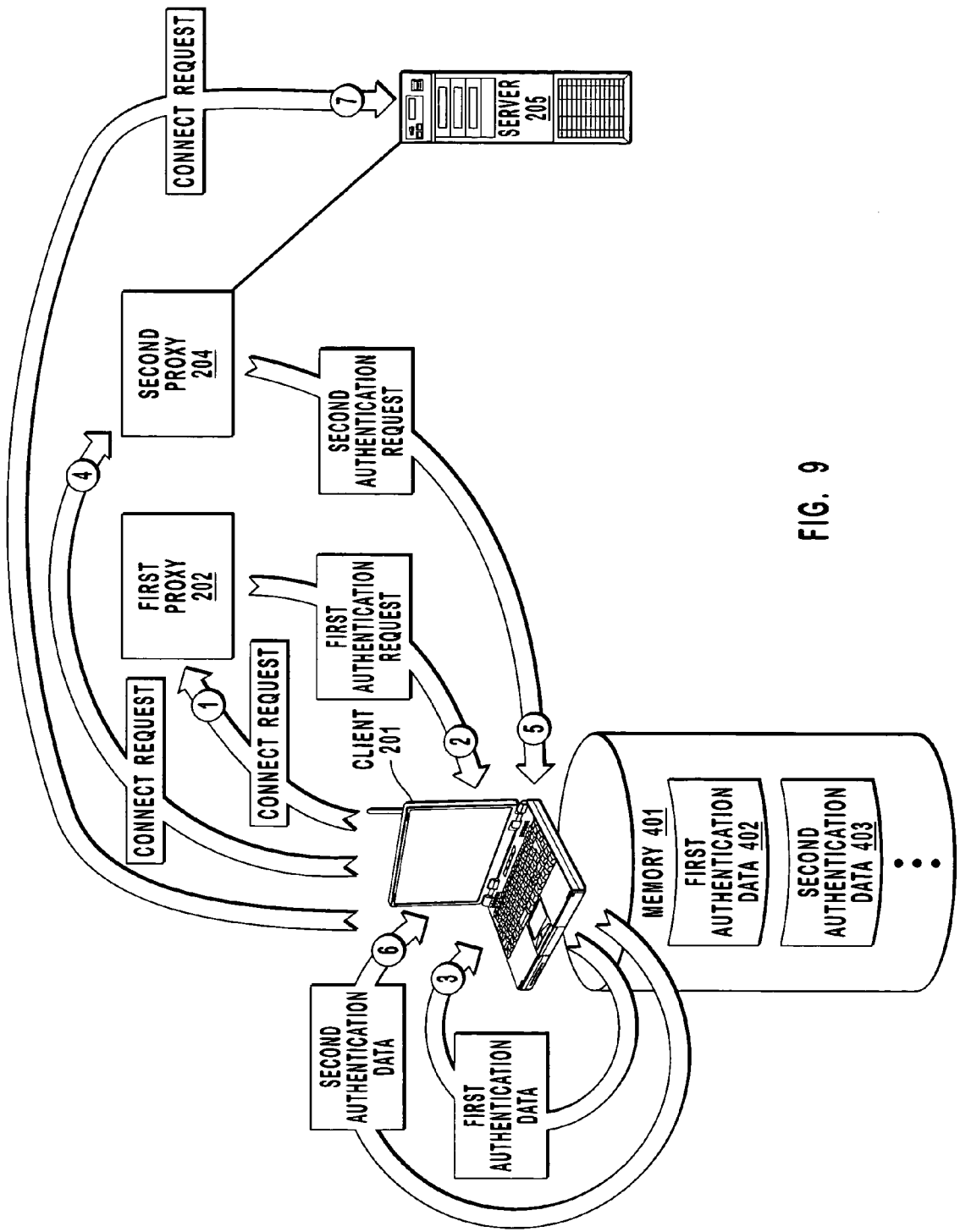
FIG. 9 illustrates seven ordered data flows followed in order for the client to communicate with the server despite having to negotiate through multiple proxies that require different authentication data in accordance with a second embodiment of the present invention.
Figure 10:
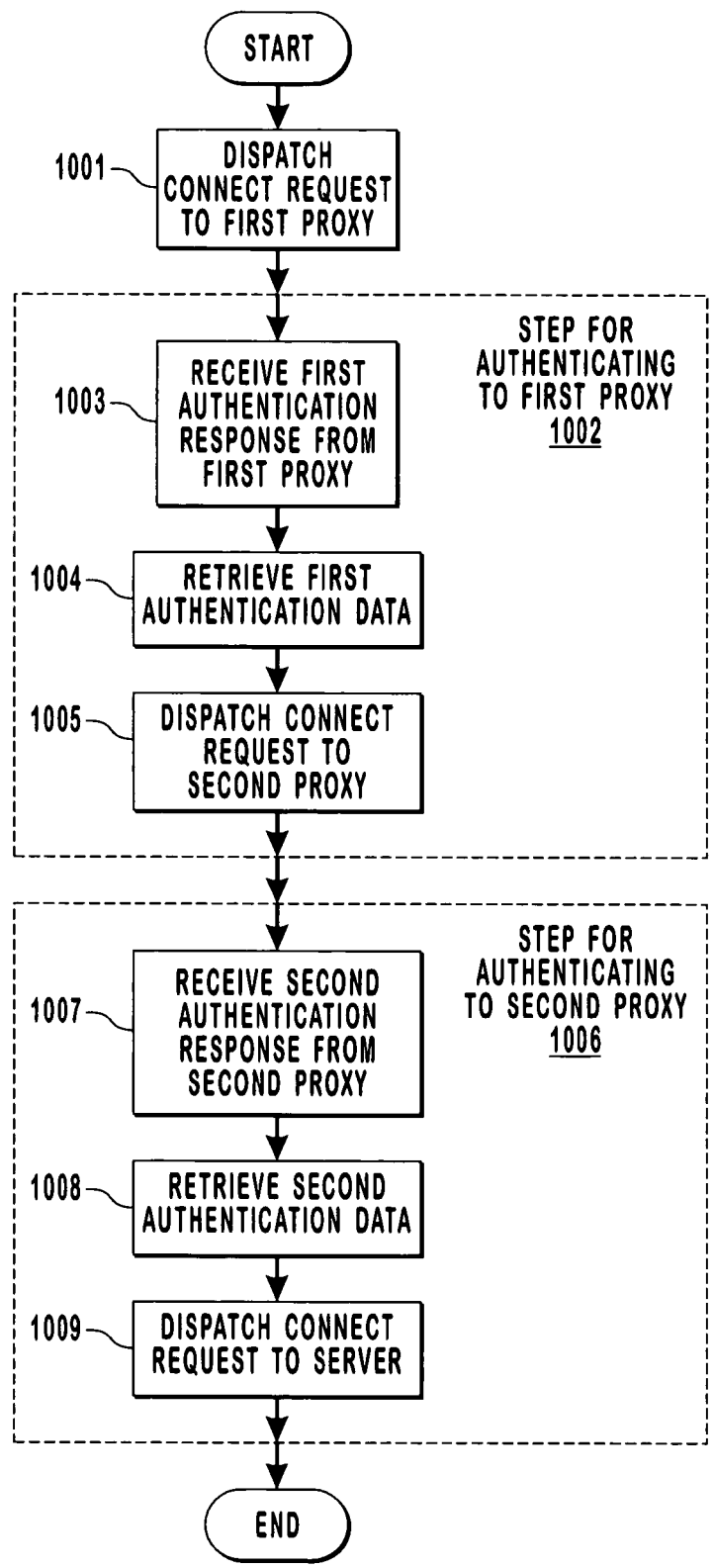
FIG. 10 illustrates a flowchart of a method for the client to communicate with the server in accordance with the second embodiment of the present invention.

FIG. 9 shows a data flow in accordance with a second embodiment for establishing a communication between the client 201 and the server 205. FIG. 10 illustrates a flowchart of a method performed in the environment illustrated in FIG. 9. The second embodiment will now be described with frequent reference to both FIG. 9 and FIG. 10.

Referring to FIGS. 9 and 10, the client 201 first dispatches a connection request to the first proxy 202 (act 1001). This connection request may be a request in accordance with the Internet standard HTTP. However, the connection request should be made using a protocol that allows for connection requests to be made to proxies. One such protocol is the Secure Socket Layer (SSL) protocol, which may be implemented in harmony with HTTP.

The client 201 then performs a step for authenticating to the first proxy (step 1002) which, in the embodiment illustrated in FIGS. 9 and 10, includes corresponding act 1003, act 1004 and act 1005. Specifically, the first proxy 202 dispatches a first authentication request, which the client 201 ultimately receives (act 1003). The first authentication request may be, for example, a 407 Proxy Authentication Response in accordance with HTTP. In response to this authentication request, the client 201 retrieves first authentication data 402 from memory 401, the first authentication data 402 associated with the first proxy (act 1004). The client 201 then dispatches a connection request to the second proxy 204, the second request including the first authentication data 402 (act 1005). The client 201 may retrieve the first authentication data 402 and dispatch the connection request to the second proxy 204 automatically, and without requiring user intervention, upon receiving the authentication request from the first proxy 202.

The client 201 then performs a step for authenticating to the second proxy (step 1006) which, in the embodiment illustrated in FIGS. 9 and 10, includes corresponding act 1007, act 1008 and act 1009. Specifically, the second proxy 204 dispatches a second authentication request, which the client 201 ultimately receives via the first proxy 202 (act 1007). The first proxy 202 received the second connection request destined for the second proxy 204, used the first authentication data 402 to authenticate the user of the client 201, and entered byte forwarding mode thus allowing the first proxy 202 to be effectively transparent to the client 201. The connection request is thus properly forwarded to the second proxy 204. Since the second proxy 204 does not recognize the first authentication data 402, and since no other authentication data was provided in the connection request, the second proxy 204 dispatched the second authentication request. The second authentication request may also be a 407 Proxy Authentication Response.

In response to this second authentication request, the client 201 retrieves second authentication data 403 from memory 401, the second authentication data 403 associated with the second proxy 204 (act 1008). The client 201 then dispatches a connection request to the server 205, the third request including the first authentication data 402 and the second authentication data 403 (act 1009). The client 201 may retrieve the second authentication data 403 and dispatch the connect request to the server 205 automatically, and without requiring user intervention, upon receiving the authentication request from the second proxy 204. The first proxy 202 then uses the first authentication data 402 within the third connection request to authenticate the user of the client 201, and then forwards the third request to the second proxy 204. The second proxy 204 then uses the second authentication data 403 within the third connection request to authenticate to the second proxy 204.

As illustrated in FIG. 9, the second proxy 204 then forwards the third connection request to the server 205 to thereby establish communication between the client 201 and server 205 even though multiple heterogenic authentication proxies needed to be traversed. If there were more than two heterogenic authentication proxies involved as with FIG. 3, then the third connection request would be forwarded to the third proxy. The; processes described above with respect to FIG. 9 and FIG. 10 would be repeated until the connection request was dispatched to the server 205 and included all authentication data required by any intervening proxies.

The second embodiment requires that a protocol be implemented such as SSL that allows for connections to be made to proxies. The second embodiment also requires that the client 201 have knowledge of the address of all intervening proxies between the client 201 and the server 205. The first embodiment has no such requirement.

In both embodiments, the formulation of the third request to include both the first and second authentication data (and other authentication data if there are more than two heterogenic authentication proxies) may also be accomplished by using existing protocols to create a unique data structure as described below with reference to FIG. 11.

Figure 11:
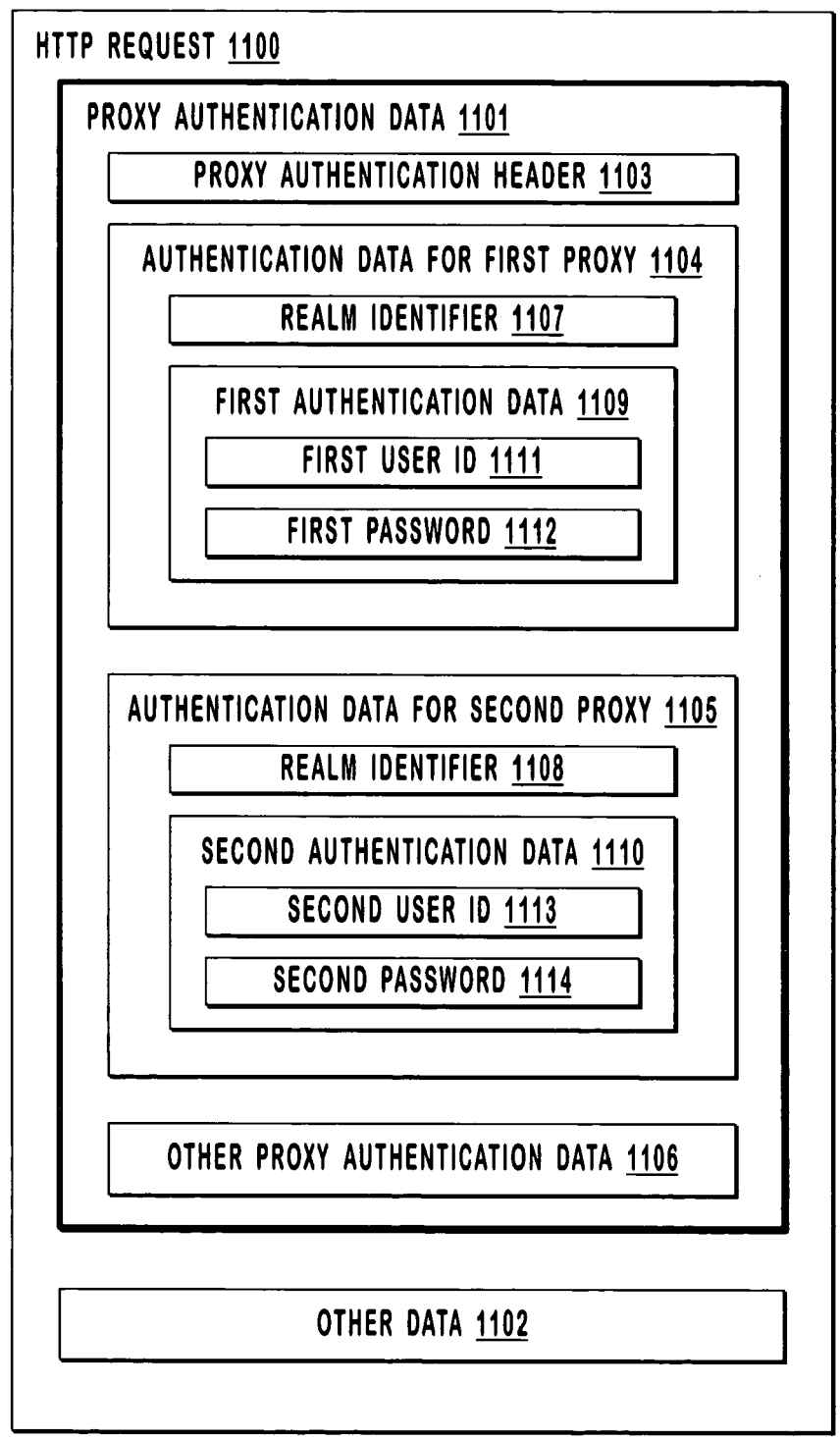
FIG. 11 illustrates a data structure of an HTTP request that may be used when submitting a request that includes different authentication data for multiple proxies in accordance with the present invention.

FIG. 11 illustrates the relevant components of an HTTP request 1100 data structure that may be used as the third request for the service (as in FIGS. 4 through 8) or as the connection request to the server (as in FIGS. 9 and 10). The HTTP request 1100 includes a data field representing proxy authentication data 1101. The authentication data 1101 includes all of the authentication data needed to traverse all heterogenic authentication proxies between the client 201 and the server 205 as will be described. The HTTP request 1100 also includes other data 1102 permissible in accordance with HTTP. This other data 1102 may include, for example, authentication data for use by the server 205.

The proxy authentication data 1101 includes a data field 1103 that identifies the proxy authentication data 1101 as being proxy authentication data. In accordance with the digest authentication method, and as permitted by HTTP, the proxy authentication header 1103 may be, for example, the WWW-Authenticate Response Header. The proxy authentication data 1101 includes authentication data for the first proxy (data field 1104), authentication data for the second proxy (data field 1105) as well as authentication data for other heterogenic authentication proxies, if any (data field 1106).

The authentication data for the first proxy includes a realm identifier 1107 that identifies that the authentication data is indeed for the first proxy 202. The authentication data for the second proxy also includes a realm identifier 1108 that identifies that the authentication data is indeed for the second proxy 204. Realm identifiers are permitted by the HTTP authentication methods although realm identifiers have not conventionally been used to separate authentication data for use by heterogenic authentication proxies. The realm identifiers 1107 and 1108 allow the first proxy 202 and the second proxy 204 to be able to locate the appropriate authentication data.

The authentication data for the first proxy includes the first authentication data 1109 (e.g., the first authentication data 402) which may include a first user ID 1111 and a first password 1112 for use by the first proxy 202. Similarly, the authentication data for the second proxy includes the second authentication data 1110 (e.g., the second authentication data 403) which may include a second user ID 1113 and a second password 1114 for use by the second proxy 204.

The digest authentication method is useful because it allows for data to be defined using realm identifiers thus allowing for the appropriate authentication data for a given proxy to be properly labeled. Also, it allows for proper encryption of the password so that the first authentication data 402 is not divulged to the second proxy 204, and so that the second authentication data 403 is not divulged to the first proxy 202. Thus, the trust boundary 203, if any, is respected in that confidential authentication data does not traverse the trust boundary.

Thus, methods, systems, computer program products and data structures are described which allow for a client to communicate with a server even though multiple proxies that require different authentication data are intervening between the client and server. Furthermore, the principles of the present invention may be implemented using existing protocols and without forcing confidential authentication data to be disclosed between the heterogenic authentication proxies.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method of a client computer system transmitting a request to a server computer system through proxies that require different authentication data, the method comprising the following:

an act of a client computer system dispatching a first request for a service;

an act of the client computer system receiving a first authentication request from the first proxy;

an act of the client computer system retrieving first authentication data for the first proxy;

an act of the client computer system dispatching a second request for the service, the second request including the first authentication data;

an act of the client computer system receiving a second authentication request from a second proxy, the first proxy having forwarded the second request for the service to the second proxy after using the first authentication data to authenticate the client computer system;

an act of the client computer system retrieving second authentication data for the second proxy; and an act of the client computer system dispatching a third request for the service to the server computer system, the third request including the first authentication data and the second authentication data, the first proxy having forwarded the third request for the service to the second proxy after using the first authentication data to authenticate the client computer system, and the second proxy having forwarded the third request to the server computer system after using the second authentication data to authenticate the client computer system.

2. A method in accordance with claim 1, further comprising the following:

an act of the first proxy removing the first authentication data from the third request; and an act of the first proxy forwarding the third request to the second proxy without the first authentication data.

3. A method in accordance with claim 1, wherein the act of the client computer system dispatching a third request for the service to the server computer system comprises the following:
   an act of the client computer system including the first and second authentication data in the third request using an HTTP authentication method.

4. A method in accordance with claim 3, wherein the act of the client computer system including the first and second authentication data in the third request using an HTTP authentication method comprises the following:
   an act of identifying the first authentication data using a first realm associated with the first proxy; and
   an act of identifying the second authentication data using a second realm associated with the second proxy.

5. A method in accordance with claim 3, wherein the act of the client computer system including the first and second authentication data in the third request using an HTTP authentication method comprises the following:
   an act of the client computer system including the first and second authentication data in a WWW-Authenticate Response Header associated with the digest authentication method.

6. A method in accordance with claim 1, wherein the first and second proxies are administered by different entities.

7. A method in accordance with claim 1, wherein the act of the client computer system retrieving first authentication data and the act of the client computer system dispatching a second request are each performed automatically, without user intervention, upon completion of the act of the client computer system receiving a first authentication request from the first proxy.

8. A computer program product for implementing a method of a client computer system transmitting a request to a server computer system through proxies that require different authentication data, the computer program product comprising a computer-readable medium having computer-executable instructions for performing the following:
   an act of a client computer system causing a first request for a service to be dispatched;
   an act of the client computer system detecting the receipt of a first authentication request from the first proxy;
   an act of the client computer system causing first authentication data for the first proxy to be retrieved;
   an act of the client computer system causing a second request for the service to be dispatched, the second request including the first authentication data;
   an act of the client computer system detecting the receipt of a second authentication request from a second proxy, the first proxy having forwarded the second request for the service to the second proxy after using the first authentication data to authenticate the client computer system;
   an act of the client computer system causing second authentication data for the second proxy to be retrieved; and
   an act of the client computer system causing a third request for the service to be dispatched to the server computer system, the third request including the first authentication data and the second authentication data, the first proxy having forwarded the third request for the service to the second proxy after using the first authentication data to authenticate the client computer system, and the second proxy having forwarded the third request to the server computer system after using the second authentication data to authenticate the client computer system.

9. A computer program product in accordance with claim 8, wherein the computer-executable instructions for performing the act of the client computer system causing a third request for the service to be dispatched to the server computer system comprises computer-executable instructions for performing the following:
   an act of including the first and second authentication data in the third request using an HTTP authentication method.

10. A computer program product in accordance with claim 9, wherein the computer-executable instructions for performing the act of including the first and second authentication data in the third request using an HTTP authentication method comprises computer-executable instructions for implementing the following:
    an act of identifying the first authentication data using a first realm associated with the first proxy; and
    an act of identifying the second authentication data using a second realm associated with the second proxy.

11. A computer program product in accordance with claim 9, wherein the computer-executable instruction for performing the act of including the first and second authentication data in the third request using an HTTP authentication method comprises computer-executable instructions for implementing the following:
    an act of including the first and second authentication data in a WWW-Authenticate Response Header associated with the digest authentication method.

12. A computer program product in accordance with claim 8, wherein the computer-executable instructions for implementing an act of the client computer system causing a first request to be dispatched, the act of the client computer system detecting the receipt of a first authentication request, the act of the client computer system causing a second request to be dispatched, the act of the client computer system detecting the receipt a second authentication request, and the act of the client computer system causing a third request to be dispatched are each performed in accordance with the HyperText Transport Protocol (HTTP).

13. A method of a client computer system connecting to a server computer system through proxies that require different authentication data, the method comprising the following:
    an act of a client computer system dispatching a connect request to a first proxy;
    an act of the client computer system receiving a first authentication request from the first proxy;
    an act of the client computer system retrieving first authentication data associated with the first proxy;
    an act of the client computer system dispatching a connect request to a second proxy, the connect request to the second proxy including the first authentication data, wherein the first proxy uses the first authentication data to authenticate the client computer system, enters byte forwarding mode, and forwards the connect request to the second proxy server;
    an act of the client computer system receiving, via the first proxy, a second authentication request from the second proxy;
    an act of the client computer system retrieving second authentication data associated with the second proxy; and
    an act of the client computer system dispatching a connect request to the server computer system or to a third proxy that requires third authentication data, the connect request to the server computer system or to the third proxy including the first authentication data and the second authentication data, wherein the second proxy uses the second authentication data to authenticate the client computer system, enters byte forwarding mode, and forwarding the connect request to the server computer system or to the third proxy.

14. A method in accordance with claim 13, wherein the act of the client computer system dispatching a connect request to the server computer system or to a third proxy comprises the following:

an act of the client computer system including the first and second authentication data in the third request using an HTTP authentication method.

15. A method in accordance with claim 14, wherein the act of the client computer system including the first and second authentication data in the third request using an HTTP authentication method comprises the following:

an act of identifying the first authentication data using a first realm associated with the first proxy; and an act of identifying the second authentication data using a second realm associated with the second proxy.

16. A method in accordance with claim 14, wherein the act of the client computer system including the first and second authentication data in the third request using an HTTP authentication method comprises the following:

an act of the client computer system including the first and second authentication data in a WWW-Authenticate Response Header associated with the digest authentication method.

17. A method in accordance with claim 13, wherein the first and second proxies are administered by different entities.

18. A method in accordance with claim 17, wherein the client computer system comprises a wireless device, and the first proxy is administered by a wireless carrier.

19. A method in accordance with claim 18, wherein the second proxy is administered by a corporate entity.

20. A method in accordance with claim 13, wherein the act of the client computer system dispatching a connect request to the first proxy, the act of the client computer system receiving a first authentication request from the first proxy, the act of the client computer system dispatching a connect request to the second proxy, the act of the client computer system receiving a second authentication request from the second proxy, and the act of the client computer system dispatching a connect request to the server computer system or to a third proxy are performed in accordance with the Secure Socket Layer (SSL) protocol.

* * * * *